United States Patent Office 3,427,186
Patented Feb. 11, 1969

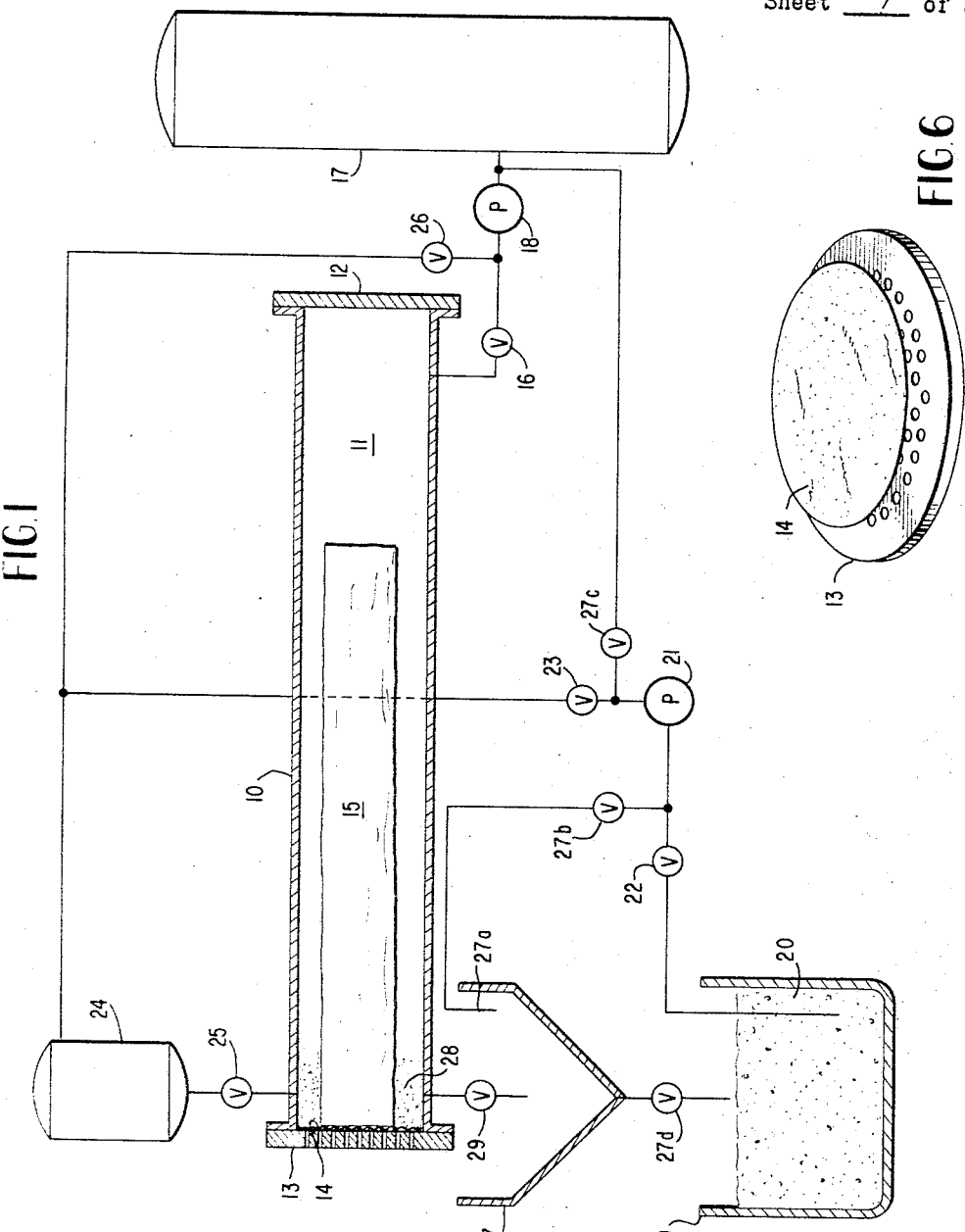
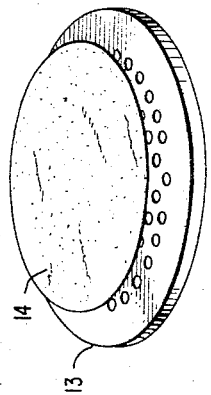
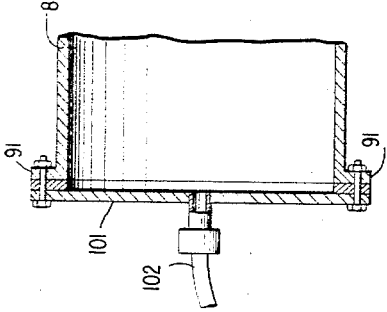

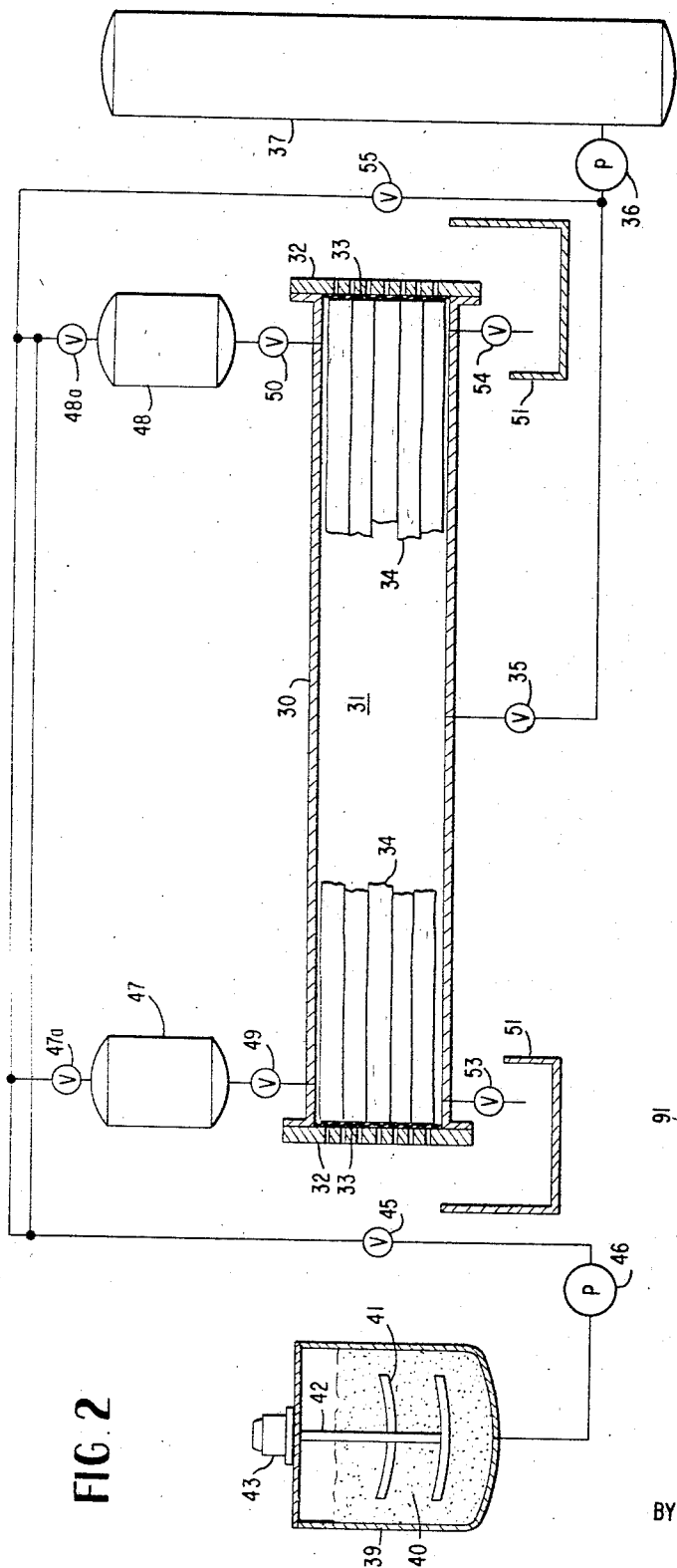
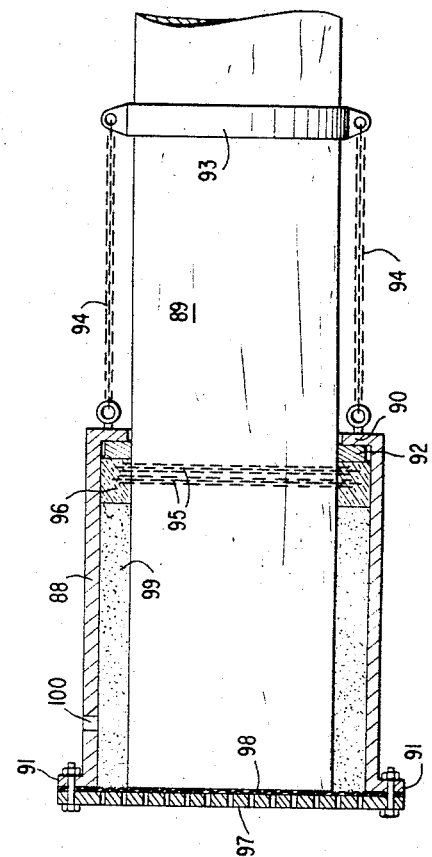

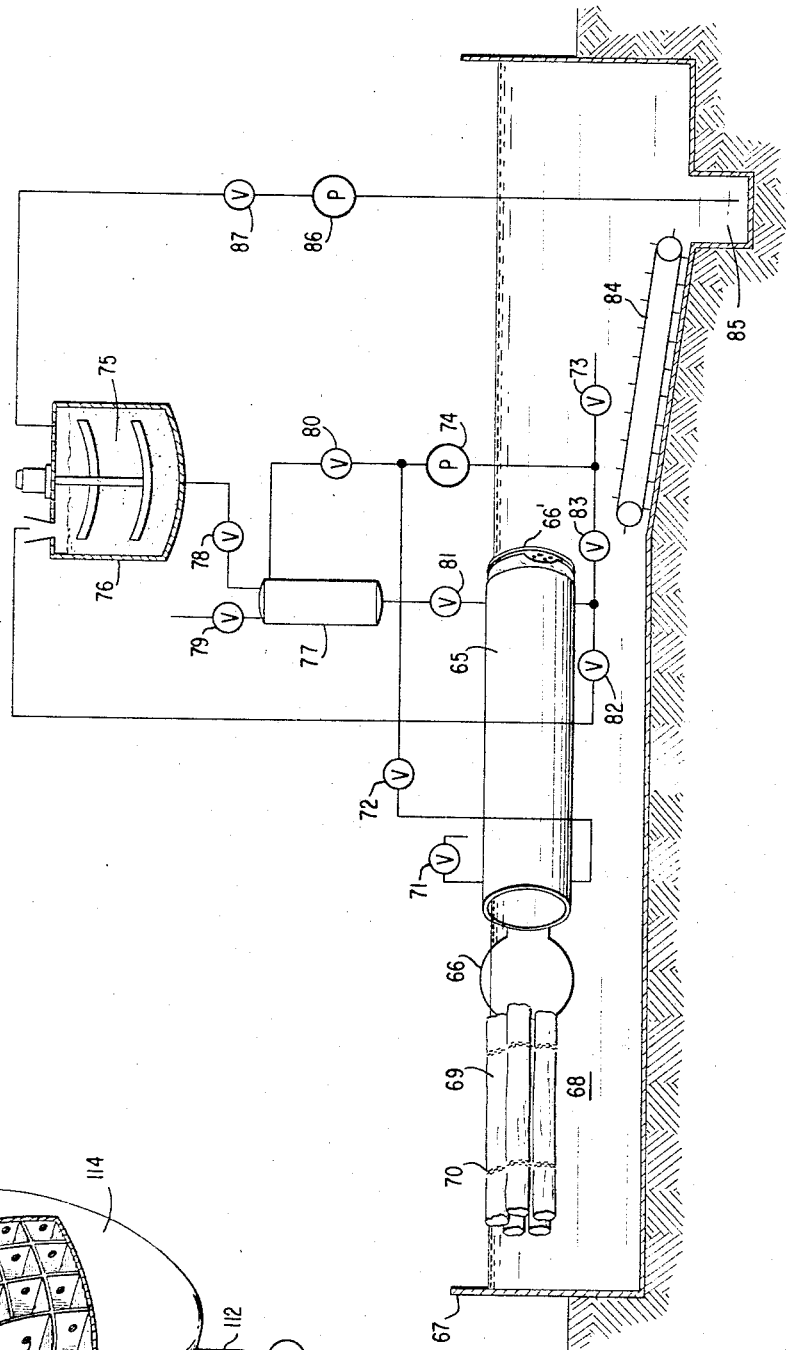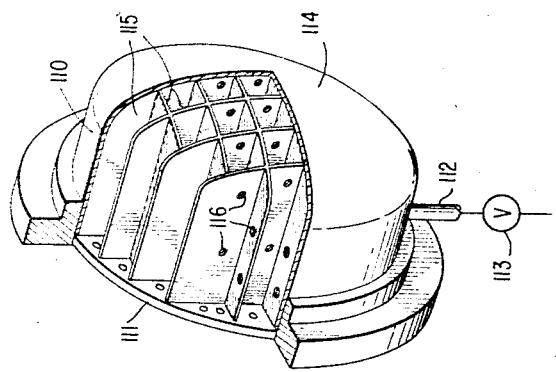

3,427,186
PROCESS AND APPARATUS FOR TREATING WOOD
Monie S. Hudson, P.O. Box 2451,
Spartanburg, S.C. 29302
Continuation-in-part of application Ser. No. 411,905, Nov. 17, 1964. This application Oct. 4, 1966, Ser. No. 584,236
U.S. Cl. 117—116        27 Claims
Int. Cl. B27k 3/00; B44d 1/26; B05c 3/00

ABSTRACT OF THE DISCLOSURE

Disclosed is a process for the impregnation of a length of wood with a fluid treating medium in which a seal is formed about one end of the length of wood using a slurry containing solid granules less than about 105 microns in diameter. After the seal is formed, liquid treating medium is passed into the reaction zone and a difference in pressure on opposite sides of the sealed area forces the treating medium through the length of wood. Also disclosed is an apparatus for pressure impregnation of a length of wood which includes a pressure vessel having a perforated member disposed cross-sectionally thereof, a porous member adjacent the perforated member, means for introducing a slurry containing solid granules of a size larger than the pores of the porous member into the pressure vessel and means for introducing fluid treating medium into the vessel under pressure.

---

This application is a continuation-in-part of copending application Ser. No. 411,905, filed Nov. 17, 1964, and now abandoned.

This invention relates to a new and improved process for longitudinally impregnating lengths of wood, including logs, poles, and the like, with fluid treating media, and further relates to new and improved apparatus for impregnating such lengths of wood.

Today's use of wood requires that it be chemically treated to meet the specific needs to which it is being applied. These treatments are designed to overcome the inherent weaknesses or disadvantages of wood, and impart new qualities which would extend its usefulness and increase its commercial value. Through treatment, such properties as resistance to decay and insects, resistance to fire, stability against shrinkage and swelling, surface finishes in depth, etc., are imparted to the wood.

It has long been the aim of those versed in the art of treating woods to be able to impregnate the wood with chemical solutions while it is in the green state, having just been felled, or even while the tree is still standing. Thus, in French Patent 11,161 is disclosed a method which is still being used to some extent in France and other European countries. This method consists essentially of placing a cap over the butt end of a freshly felled, horizontally disposed log. The cap, in turn, is connected by a hose to a gravity tank supported 25 to 30 feet above the ground and containing the chemical solution with which the wood is to be treated. Liquid pressure in the tank forces the sap through the log and out the other end, replacing it with the chemical solution.

Modifications of this process are disclosed in U.S. Patents 111,784 and 2,271,212. These known methods have numerous disadvantages including individual handling of each log or pole, and the difficulty of making a seal to each log because of varying diameters, noncircular cross-sections, varying roughness, etc. Pressures very much above 1 atmosphere are difficult to obtain and, as a consequence, the process is inefficient, costly, and time-consuming, since it usually takes from 12 to 14 days to completely treat a log.

A principal problem has been to make and maintain a suitable seal for the treating fluid while it is maintained under pressure during treatment of the log. For example, one known method involves cutting the end of a log on an angle about its circumference, and forcing the shaped end against a V-shaped die to form a seal. However, only one log at a time is thus treated and it must be individually prepared prior to its being impregnated.

Still another method involves placing a gasket over a portion of one end of the log in a treating apparatus, and then forcing the end of the log against a die while subjecting the log to treating fluid under pressure.

All of these known methods have the same shortcomings; namely, they are inefficient due to the inability of the operator to obtain and maintain a constant, high pressure in the fluid because of the leakage occurring around the seals. Furthermore, these processes are time-consuming and uneconomical, since the treatment is carried out on individual logs and special preparation of the logs is required in most instances in an effort to obtain a good seal.

It is, therefore, an object of this invention to provide a new and improved process and apparatus for impregnating lengths of wood with fluid treating media and which obviate the many disadvantages present in the known processes and apparatus.

Another object of this invention is to provide an improved process whereby one or a plurality of logs may be impregnated with fluid treating media which is longitudinally forced through the logs under high pressure in relatively short periods of time.

A further object of this invention is to provide a process whereby a large number of lengths of wood may be quickly and simultaneously impregnated throughout their lengths with a fluid treating medium with a minimum of handling and in such a short period of time as to considerably reduce the cost of impregnating wood and, consequently, the cost of treated wood, per se.

Still another object of this invention is to provide an apparatus which is suitable for handling one or a plurality of logs and which permits quick and ready penetration of the fluid treating agent throughout the length of the logs, replacing the natural fluids present in the logs.

A further object of this invention is to provide an apparatus for impregnating wood which is relatively simple in construction but yet permits the use of impregnating pressures up to about 1000 p.s.i. without affecting the seals about the ends of the logs so that the treating fluid enters the other ends of the logs and is quickly forced therethrough in a minimum of time.

In attaining the objects of this invention, one feature resides in positioning at least a portion of one end of a length of wood in a treating zone, introducing a slurry containing minute solid granules into the treating zone, and positioning the granules about the periphery of the wood in the zone away from the free end of said wood. The granules thus form a sealing cake about the length of wood of a thickness sufficient to prevent any appreciable amount of fluid passing therethrough and out of the zone. A fluid treating medium is then introduced into said zone and a difference in pressure is effected between opposite sides of the sealed area about the length of wood with the pressure being sufficient to force the fluid treating medium into the free end of the length of wood while simultaneously forcing out the other end, the natural fluids present in the wood.

Another feature resides in an apparatus comprising a pressure vessel having a perforated member supporting a porous member disposed cross-sectionally thereof and together defining a treating zone for a length of wood held therein with one end thereof in contact with the porous member. Means are provided for introducing a slurry containing minute solid granules into the treating zone and positioning the granules about the periphery of the length of wood adjacent to the end that is in contact with the porous member to form a sealing cake sufficient to prevent passage of any appreciable amount of fluid therethrough. Means are also provided for introducing a fluid treating medium into said zone under high pressure sufficient to cause the fluid to pass through the length of the wood while the seal formed by the sealing cake is maintained.

Other objects, features and advantages of the invention will become more apparent from the following description when taken in conjunction with the accompanying drawings, wherein:

FIG. 1 is a diagrammatic view of an embodiment of the apparatus of the invention for impregnating a log in accordance with the process of the invention;

FIG. 2 is a diagrammatic view of another embodiment of the apparatus of the invention;

FIG. 3 is a diagrammatic view of still another embodiment of the apparatus of the invention;

FIG. 4 is a cross-sectional view of another embodiment of the apparatus suitable for treating a single log;

FIG. 5 is a cross-sectional view of a portion of the pressure means utilized in forcing treating fluid into an end of the log;

FIG. 6 is a perspective telescopic view of the perforated member and the porous member used in the foregoing apparatus; and FIG. 7 is a perspective partially cut away view of a perforated member for use in the foregoing apparatus.

In describing the invention, reference is made to FIG. 1 of the drawing, wherein a pressure vessel 10, having treatment zone 11 of suitable length and diameter to accommodate the length of wood being processed, is provided with a removable closure 12 at one end thereof and a perforated plate 13 at the opposed end thereof. The plate 13 is made of suitable material of sufficient rigidity to enable it to withstand the pressures within the vessel 10. A porous member 14, preferably of fabric, is positioned adjacent perforated plate 13 at one end of the chamber.

After log 15 has been placed into the treatment zone 11 of vessel 10 with one end of log 15 in contact with porous member 14, the vessel is closed and made pressure tight. Valve 16 is opened and treatment zone 11 is filled with treating liquid from working tank 17 by means of pump 18. Since perforated plate 13 and porous member 14 are not blocked at this time, considerable treating liquid flows through them once treatment zone 11 is filled. This is collected in receiving tank 27.

Tank 19 contains a slurry 20 of minute particles of inert material which can be continuously stirred (by means not shown) so as to maintain the particles in suspension. Once treatment zone 11 is filled with the treating liquid from tank 17, valve 16 is closed and valves 22 and 23 are opened. Slurry 20 is conveyed by pump 21 from mixing tank 19 to dosing tank 24 through valves 22 and 23. After the desired amount of slurry has been transferred from mixing tank 19 to dosing tank 24, pump 21 is stopped and valves 22 and 23 are closed. Valve 25 beneath dosing tank 24 and valve 26 are then opened so that treating liquid being pumped by pump 18 is conveyed through dosing tank 24 forcing slurry 20 into treatment zone 11 of pressure vessel 10. Since treatment zone 11 is full of liquid, slurry 20 moves with the liquid flow toward porous member 14. When the inert solid material in the slurry reaches porous member 14, it is stopped and builds up seal 28 about the end of log 15. Slurry 20 is pumped into treatment zone 11 to form a seal 28 of a thickness of a few inches to a foot or more, depending upon the particle size of the inert component of the slurry. Thus, with very fine particle sizes, a thickness of a few inches will prove satisfactory and provide a good seal 28 about the end of log 15. With coarser particles, thickness of from 2 to 4 feet may be required to give a seal which will prevent fluid in zone 12 from passing therethrough. In the preferred embodiment of the invention, the slurry-carrying fluid in tank 19 is the same as the liquid treating medium in tank 17.

Seal 28 halts the rapid flow of treating liquid out through perforated plate 13. After seal 28 is established, valve 16 is opened. By leaving valves 25 and 26 open, the dosing tank can continually supply slurry to the seal area in case there are pockets unfilled by the initial dose of slurry, as in crevices of bark if an unpeeled pole is being treated. This continual supply of slurry also fills up space produced in the seal area by compaction of the slurry against the porous member as the pressure is increased. Pump 18 carries the liquid treating medium from working tank 17 through valve 16 into treatment zone 11 and establishes a pressure in treatment zone 11. Pressures above 50 p.s.i. and on the order of 200 p.s.i. are used, but pressures as high as 1,000 p.s.i. or more can be applied in this manner. Pressure within treatment zone 11 forces the treating liquid against sealing medium 28 which has a high resistance to flow and further compacts the particles to form an even tighter seal about the end of log 15. Since the resistance to flow is less through the path provided by the log, the liquid treating medium is forced into the exposed end of log 15, through the log where it pushes the natural fluids present in the log out ahead of it and, finally, through the opposed end of log 15, through porous member 14 and perforated plate 13 into receiving tank 27. When the liquid entering receiving tank 27 is the same as the treating liquid from working tank 17, log 15 has been thoroughly impregnated.

After impregnation of log 15, valves 16, 25, and 26 are closed and valve 29 is opened to allow the liquid content of the cylinder to discharge into receiving tank 27 carrying with it much of the slurry that formed the seal. The perforated plate 13 and porous member 14 are removed and the remainder of the slurry is washed from the end of the pole by means of a hose (not shown). The washings are received in tank 27, the slurry settling to the bottom. Next, clear treating solution is pumped from tank 27 through hose 27a (which is positioned in the tank so as to pick up clear liquid), valve 27b, pump 21 and the valve 27c back to working tank 17. Valve 27d is then opened to allow the slurry to drain into mixing tank 19.

Using the apparatus illustrated in FIG. 1, a southern pine pole was impregnated with a 3% aqueous solution of chromated copper arsenate, which consists of a mixture of 45% sodium dichromate, 30% copper sulphate and the remainder arsenic pentoxide. This solution was placed in tank 17 and also was used as the liquid phase of the slurry in tank 19. Waste screenings from a granite quarry were used as the solid phase of a slurry containing from 50 to 70% solids. These screenings were of a particle size passing through a 140 mesh screen. Pressure of 100 pounds per square inch was used in zone 11, and the solution of chromated copper arsenate was forced into the end of the log during a period of ½ hour. Upon removing the log from the vessel, it was ascertained that the preservative solution was uniformly distributed throughout the log.

By testing the solution in tank 27, it was noted that the concentration had fallen to about 2.8% due to the dilution of the treating liquid with that from the log. Enough chromium-copper-arsenic mixture was then added to tank 27 to bring the concentration back to 3% before returning it to tank 17.

Again using the apparatus of FIG. 1, a green southern pine pole was impregnated with a 5% solution of pentachlorophenol dissolved in diesel oil (No. 2 fuel oil). Finely ground feldspar (particle size of less than 5% on a 200 mesh screen and not more than 1% on a 140 mesh screen) was mixed with a diesel oil-pentachlorophenol solution to form a slurry containing about 50% ground feldspar. This slurry was transferred to dosing tank 24. The cylinder 10, containing a green pole, was filled with 5% pentachlorophenol in diesel solution from working tank 17 by opening valve 16 and starting pump 18. After the cylinder was full, the pressure was held at 20 p.s.i. Valves 25 and 26 were opened and valve 16 was closed. This caused the slurry to flow through valve 25 into treatment zone 11. At this pressure, two minutes was sufficient to allow the slurry particles to be positioned about the periphery of the pole at the end adjacent porous member 14 and form an effective seal 28 to the passage of any appreciable amount of fluid therethrough. After forming seal 28, valve 16 is reopened and the pressure in treatment zone 11 raised to 150 p.s.i. and maintained for a period of 3 hours. After the pole was removed, it was examined and found to be thoroughly impregnated with pentachlorophenol diesel oil solution.

While only one pole has been treated in the apparatus in FIG. 1, it will be apparent that this apparatus can be used to treat a plurality of poles simultaneously. Because of the minute particle size of the suspended phase in the sealing slurry, it is unnecessary to separate the poles by means of spacers. These minute particles enter the smallest space between the poles and form an effective seal. Because spacers are unnecessary, the process can be practiced with little preparation and a series of runs can be performed rapidly.

The inert suspended phase of the slurry used for purposes of this invention is preferably sand or very fine powdered material such as kaolin, feldspar, clay, fuller's earth or other nonmetallic materials. However, any finely divided material, whether an inorganic, nonmetallic mineral, metal, or even an organic material such as wood sawdust or wood flour, can be used. Chemical precipitates such as iron or aluminum hydroxide, calcium sulfate or reaction products precipitated from chrome-copper-arsenic wood preservatives, may also be used as the suspended phase in the slurry. Important in the practice of this invention is that the inert suspended phase be comprised of particles of minute size. These particles can be characterized as being too small for the individual grains to be perceptible to human touch. Preferably, the particles are of such size that substantially 100% pass through a U.S. sieve No. 140, i.e., the particles have a size of less than 105 microns. Because the spacing between adjacent particles of the seal is negligible, the seal is very effective in preventing liquid flow. Moreover, the minute particles are able to enter the smallest space between adjacent poles and thereby obviate the need for mechanically spacing the poles within the treating chamber. Generally, the slurry contains from 40%–80% solids by weight.

In practicing the invention, it is also contemplated that larger particles, for example in the range of 590–840 microns, be employed in conjunction with the minute comminuted materials. When this is done, a seal of the coarser particles is formed adjacent the porous member 14 and a seal of the smaller particles is formed adjacent the first seal.

Another embodiment of an apparatus suitable for treating a large number of logs or poles in accordance with the process of this invention is illustrated in FIG. 2 wherein pressure vessel 30 having treatment zone 31 is provided with removable perforated closure members 32 at each end thereof. Porous members 33 are located adjacent perforated closure members 32. After a plurality of poles 34 are placed in pressure vessel 30, porous members 33 are placed adjacent the ends of the poles and perforated closure members 32 are locked in place by means not shown. Because of the minute size of the solid particles which will be used to form the seal, poles 34 can merely be stacked in pressure vessel 30 thereby obviating the need for spacers between adjacent poles.

Valve 35 is then opened and treatment liquid conveyed to treatment zone 31 by pump 36 from working tank 37. Since the ends of pressure vessel 30 are not sealed at this time, treatment liquid will flow through porous members 33 and perforated closure members 32 to be collected in receiving tanks 51. After pressure vessel 30 is filled with treatment liquid, valve 35 is closed and valve 45 opened.

Mixing tank 39 contains a slurry 40 of particles of the type described above which is continuously stirred by paddles 41 mounted on shaft 42 and rotated by motor 43 so as to maintain the particles in suspension. By means of pump 46, the slurry 40 is carried from the bottom of mixing tank 39 through pump 46 and valve 45 into dosing tanks 47 and 48 by alternately opening valves 47a and 48a. Valve 45 is then closed and both valves 47a and 48a left open. Valves 49 and 50 below dosing tanks 47 and 48 are then opened to permit flow of slurry 40 about the ends of poles 34. Valve 55 is opened and liquid flow from working tank 37 is carried by pump 36 through valve 55 into dosing tanks 47 and 48 thereby forcing slurry 40 into pressure vessel 30.

Since pressure vessel 30 is full of treatment liquid, slurry 40 moves toward perforated closure members 32 with the suspended phase being stopped by porous members 33.

Slurry particles forced against perforated closure members 32 build up on porous members 33 to form a compressed sealing cake which effectively blocks any further passage of any appreciable amount of liquid through porous members 33. Valve 35 is opened. Pump 36 again carries treating liquid from tank 37 through valve 35 and into treatment zone 31. The pressure within treatment zone 31 is increased to a desired level sufficient to cause the treating liquid to enter the exposed ends of the poles and pass therethrough, forcing the natural fluids in the poles to pass out in advance thereof through porous members 33 and perforated closures 32 into receiving tanks 51 which, by this time, have had the excess treating liquid removed therefrom so that it is not comingled with the natural fluids of the logs. The required amount of salt can be added to the fluid from the logs before it is transferred to working tank 37, so that the treating liquid in tank 37 is not diluted.

As soon as the logs have been impregnated, valves 35, 49, 50 and 55 are closed and valves 53 and 54 opened to allow the liquid to drain from the cylinder to the receiving tanks carrying with it much of the slurry that formed the seal. As soon as the sealing particles have settled out in the receiving tanks, the clear liquid is pumped back to the working tank by means not shown and the slurry is returned to the mixing tank 39 by means not shown.

Using the apparatus of FIG. 2, two groups of logs can be simultaneously impregnated with treating liquid. Because spacing members between adjacent logs are not required, the logs can be merely stacked within pressure vessel 30 making the apparatus of FIG. 2 an attractive commercial means for rapid impregnation of wood products.

In FIG. 3 there is disclosed still another embodiment of apparatus utilizing the process of the invention. A treating vessel or chamber 65 is provided with quick-opening doors 66, 66', and is partially submerged in tank 67 containing the treating liquid 68. A charge 69 of poles, posts, or lumber, banded together by loose-fitting chains (rings may also be used) is placed in tank 67 and floated into the treating chamber 65 after the door 66', which consists of a perforated plate covered with a porous fabric, has been closed and locked. The plurality of poles is positioned against the porous fabric of door 66' by suitable means, not shown, and then the door 66 is also closed and sealed tight.

Valves 71, 72, and 73 are then opened and pump 74 is started. Treating solution 68 from tank 67 enters through valve 73, passes through valve 72 and enters the bottom of chamber 65, while air is expelled through valve 71. When treating chamber 65 is full, valves 71 and 72 are closed and slurry 75 from tank 76 is passed into tank 77 through valve 78. Valve 79 is opened during this time. The amount of slurry in tank 77 is that which gives a good seal on the fabric carried by the perforated door 66'. Valves 78 and 79 are then closed and valve 80 is opened for a sufficient period of time to move the slurry by means of pump 74 from tank 77 through valve 81 into the end of chamber 65 and have the particles positioned about the logs to form an effective sealing cake against the porous fabric of the door 66'. After the seal has been formed, valve 80 is closed, valve 72 is opened, and pressure is applied to the liquid in chamber 65 by pump 74, such pressure being sufficient to force the liquid through the logs 69, which is the path of least resistance.

At the end of the impregnation time, valve 82 is opened while pump 74 is still operating, to permit most of the slurry to be swept away from the fabric and out through valve 82 back to slurry mixing tank 76. This transfer occurs very quickly and the valve 82 is closed and pump 74 is stopped. Valve 83 is then opened to allow the pressure in chamber 65 to bleed back into tank 67 through valve 73. Door 66 is then opened and the charge 69 is removed.

Any slurry adhering to the fabric on the door 66' is washed off into the bottom of tank 67 where it settles and is then moved by slurry rake 84 to sump 85. Diaphragm pump 86 carries the slurry from sump 85 through valve 87 into slurry tank 76.

Still another apparatus for treating single poles or logs is illustrated in FIG. 4 wherein a pressure vessel 88, preferably consisting of steel pipe from 1 to 3 feet long and from 6 to 24 inches in diameter, depending upon the size of the pole to be impregnated, is placed about one end of a pole 89. One end of the vessel 88 is provided with an inwardly extending retaining flange 90 about its periphery. A bolting flange 91 is provided on the other end of the vessel.

In operation, pressure vessel 88 is fitted onto one end of pole 89. An adapter ring 92 having a diameter substantially that of the pole, or a little larger, is fitted over the pole and into adjoining relation with retaining flange 90. After the other end of vessel 88 is adjusted so that end of the pole is even with the bolting flange 91, ring clamp 93 which is secured to retaining flange 90 by means of heavy chains 94 is pulled to the right of the pole until the chains are taut and then is tightened about the pole by bolts, not shown.

In a preferred embodiment, and to make a satisfactory seal as expeditiously as possible, a length of small link chain 95 is wrapped around the pole near its end and then pushed back into the vessel 88 until it is adjacent the adapter ring 92. A loose roving of glass fibers, glass wool (angel hair) or cotton is then placed into the vessel 88 and packed about the pole adjacent the chain 95. A perforated plate 97 or heavy wire screen is then bolted to the flange 91 with a high porosity filter cloth 98 being disposed between plate 97 and the end of pressure vessel 88.

At this time, the space within the pressure vessel not occupied by the pole is filled with a slurry 99 which is fed through opening 100, preferably under pressure. Excess liquid will drain through the filter cloth and the vessel is completely filled with a slurry sealing cake, particularly if the slurry is fed in under pressure. Opening 100 is then closed and sealed (not shown). At the other end of the vessel, the slurry granules pressing against the glass fiber, link chain, and adapter ring form a fluid-tight seal about the periphery of the pole.

Perforated plate 97 and porous filter 98 are then removed and cap 101 is secured to bolting flange 91 as shown in FIG. 5. Conduit 102 leads to a liquid treating medium tank, not shown, so that treating liquid, under pressure, can be forced into the pressure vessel 88. Again, because the liquid cannot escape through the slurry sealing cake about the pole, it follows the path of least resistance and passes through the length of the pole. When the treating fluid begins to show through the other end of the pole, the pole can be considered as being fully impregnated with the fluid.

A solution containing 5% of a mixture containing 45 parts sodium dichromate, 35 parts copper sulfate and 20 parts arsenic pentoxide was introduced, through conduit 102, into a green southern pine log having an 8 inch diameter and 20 foot length. The pressure at which the solution was initially applied was small and then gradually and progressively increased until it was at 200 p.s.i. at the end of fifteen minutes. As the pressure increased, the barrier or seal formed by the link chain, the fiber glass, and the slurry was consolidated, so that practically all of the impregnating solution entered the end of the pole, forcing the sap out ahead of it. Any collecting means may be placed at the end of the pole from which the sap and, eventually, the treating solution emerge. The log was thoroughly impregnated at the end of two hours. Posts from 4 to 6 inches in diameter and six feet long were impregnated in about 15 minutes using the method and apparatus of FIG. 4.

It is to be understood that the small link chain can be replaced by a suitable wire spring, rubber ring, felt, plumber's tow, cotton rope, or the like. Likewise, excelsior, cotton, wadded newspapers, and the like, can be used in place of glass fibers.

Since pressures of at least 50 p.s.i. and preferably 200 p.s.i. or higher are used in the practice of this invention, it is necessary that the perforated plate or closure member be of suitable material of sufficient rigidity to enable it to withstand these high pressures. As illustrated in FIG. 6, plate 13 has a plurality of perforations therein. Porous member 14, preferably fabric and of substantially the same configuration as perforated plate 13, is positioned on plate 13 and, with the plate effectively forms an assembly to stop passage of the inert minute particles within the slurry. It is preferred that porous member 14 be of a material resistant to damage by the treating liquid. Fabrics of synthetic fibers, such as polyethylene, polypropylene, polyesters, polyamides and polyacrylics, can be effectively used for this purpose. Metallic screens, such as stainless steel screens, can also be used. If the operator is unconcerned with fabric replacement, natural fiber fabric such as cotton can be employed. Ideally, the pores within porous member 14 are smaller than the particle size of the suspended material in the slurry. However, because of the minute size of the particles used, on the order of 105 microns or less, this is difficult to achieve and small amounts of particles will usually pass through porous member 14 before the seal is consolidated by pressure. After consolidation, nothing but clear liquid passes through the porous member.

FIG. 7 illustrates a closure member designed for use in commercial operations at high pressure. Closure member 110 is provided with a perforated plate 111 through which natural fluids and treating liquid can flow. These liquids are removed from the closure member through conduit 112 and valve 113. Between this plate 111 and elliptical head 114 is a honeycomb construction 115 of steel webs having circular orifices 116 therein. Honeycomb 115 transmits the load on plate 111 to the elliptical head 114. In use, a porous member is positioned adjacent perforated plate 111 to complete the assemblage.

From the foregoing discussion of the process of the invention and the various embodiments of apparatus which can be used in practicing the process, it will be understood that applicant has disclosed an improved method for chemically treating lengths of wood, including logs, poles, and the like, irrespective of the varying diameters, noncircular cross-sections, varying roughness, etc., of the wood. All that is necessary is for the end of the log, pole, etc., about which the sealing cake is formed by the slurry, to be in open communication with the porous fabric or screening against which the end is in contact. By forming an effective seal with the slurry particles, the treating medium which is under pressure can be forced through the lengths of the logs, poles, etc.

Among the chemical treating media which can be utilized for the purpose of this invention are those normally used for the purposes of treating wood to preserve it from decay; to make it fire-retardant; to dimensionally stabilize the wood, i.e., prevent its shrinkage and swelling with changes in moisture content; to render it resistant to chemicals such as acids and alkalis, etc. Among the examples of wood preservatives which may be utilized are included aqueous solutions of preservative salts such as acid copper chromate, ammoniacal copper arsenite, chromated copper arsenate, copperized chromated zinc arsenate, chromated zinc chloride, fluor-chrome-arsenate-phenol preservatives, and the like. Oily type preservatives, such as creosote, creosote-coal tar solutions, and petroleum solutions of oil-soluble preservatives such as pentachlorphenol and copper naphthenate can also be used.

Among examples of fire-retardant chemicals in aqueous solutions that can be applied by the method of the invention are included in the fire-retardant formulations listed in the Manual of the American Wood Preservers Association and referred to as Types A, B, C, and D inclusive. The aqueous solutions of urea, polyethylene glycol, and the like, are suitable for dimensionally stabilizing wood, while bituminous substances of various types can be used to render wood resistant to attack by chemicals. Wherever necessary, the liquid treating medium may be heated and applied to the wood in heated form. In this situation, it is important that the comminuted material in the seal be selected so as not to be soluble in the heated treating liquid.

While the process of the invention is primarily suitable for treating green wood, it is possible to treat partially seasoned wood.

The disclosed method can also be used for drying wood by first sealing it in the pressure vessel as described with respect to FIG. 1, then filling the treating zone 11 with a liquid such as kerosene, diesel oil, or creosote, and heating the liquid while at the same time maintaining enough pressure on it to hold the slurry aggregates in place, and to offset the steam pressure built up in the wood by heating of the water contained in it. The steam formed by heating can escape from the wood by passing through the length thereof and through porous member 14 and perforated plate 13. Also, it is possible to carry out solvent drying of wood by means of the process. For example, a pole placed in the treating zone and sealed with slurry can be subjected to solvent seasoning agents such as acetone, methanol, ethanol, isopropanol, butanol, etc. The treating liquid will quickly displace the water from the pole, after which the solvent can be displaced from the pole by forcing a gas such as nitrogen, carbon dioxide or the like through the pole.

Furthermore, using the apparatus of the present invention, and taking advantage of the effective seal formed in the manner described above, it is possible to treat lengths of wood in such a way that the walls of the wood cells are left saturated with the treating liquid, but the cell cavities are substantially free of excess liquid. To achieve this, and again referring to FIG. 1, after the logs have been saturated with the treating solution, pump 18 is stopped. An inert gas under pressure, such as compressed air, is then forced into zone 11 by means not shown, and the liquid medium is permitted to flow through valve 16 back into tank 17. When the liquid level in zone 11 drops to the opening to valve 16, valve 16 is closed. The compressed air in treating vessel 10 then flows through the poles and forces the excess liquid in the wood cells ahead of it out through porous fabric 14 and perforated plate 13. In this manner, an "empty cell" treatment can be obtained in which the walls of the wood cells are left saturated with the treating liquid, but the cell cavities are substantially free of excess liquid. The compressed air can then be released from treating chamber 11 and the charge removed in the usual manner.

It is to be understood that while the seal described above does not completely stop the flow of fluid through it, it does reduce the flow to an extent sufficient for pressure to build up on the free ends of the poles and logs, which pressure forces the treating fluid through the poles and logs.

What is claimed is:

1. A process for the impregnation of at least a substantial portion of the interior of a length of wood, including a log, pole, and the like, with a fluid treating medium comprising positioning at least a portion of one end of said wood in a treating zone, introducing a slurry containing solid granules less than about 105 microns in diameter into said zone and positioning said granules about the periphery of said length of wood in said zone away from said end of said wood, said granules forming a sealing cake about said length of wood of a thickness sufficient to prevent any appreciable amount of fluid from passing therethrough and out of said zone, and introducing a fluid treating medium into said zone and effecting a difference in pressure between opposite sides of the sealed area about said length of wood, said pressure being sufficient to force said fluid treating medium into said end of said length of wood while simultaneously forcing out the natural fluids present in said wood.

2. The process as defined in claim 1 wherein said difference in pressure is maintained for a period of time sufficient to impregnate all of the treatable part of said wood with said fluid treating medium.

3. The process as defined in claim 2 comprising the additional step of introducing a gas under pressure through said entire length of wood impregnated with said fluid treating medium.

4. A process for the impregnation of at least a substantial portion of the interior of length of wood including logs, poles, and the like, with a fluid treating medium comprising positioning said length of wood in a treating zone, introducing a slurry containing solid granules substantially all of which are less than about 105 microns in diameter into said zone and positioning said granules about one end of said length of wood while leaving the said end in communication with the exterior of said zone, said granules forming a sealing cake about said length of wood of a thickness sufficient to prevent any appreciable amount of fluid from passing therethrough and out of said zone, placing a fluid treating medium in said zone to immerse said length of wood including the other end thereof and effecting a difference in pressure between opposite sides of the sealed area adjacent the end of said length of wood, said pressure being sufficient to force said fluid treating medium into said other end of said length of wood while simultaneously forcing out the natural fluids present in said wood.

5. A process for the impregnation of the interior of lengths of wood including logs, poles, and the like, with a liquid treating medium comprising positioning said lengths of wood in substantially parallel relationship in a treating chamber, introducing a slurry containing solid granules less than about 105 microns in diameter into said chamber and positioning said granules about the periphery of each of said lengths of wood adjacent one end thereof while leaving each of said ends of said lengths of wood in communication with the exterior of said chamber, said granules forming a sealing cake about said lengths of wood of a thickness sufficient to prevent any appreciable amount of fluid from passing therethrough and out of said chamber, introducing a liquid treating medium into said chamber to immerse said lengths of wood including the other ends thereof and effecting a difference in pressure between opposite sides of the sealed area adjacent the ends of said lengths of wood, said pressure being sufficient to force said fluid treating medium into said other ends of said lengths of wood while simultaneously forcing out the natural fluids present in such wood.

6. The process as defined in claim 5 wherein said difference in pressure is effected by applying a positive pressure to said liquid treating medium in said chamber to force said medium into said other ends of said logs.

7. The process as defined in claim 5 wherein a first slurry introduced into said chamber consists essentially of coarse solid particles, said particles positioned about the periphery of each of said logs adjacent one end thereof, introducing a second slurry containing solid granules into said chamber, said granules in said second slurry being less than about 105 microns in diameter and being relatively finer in size than the granules in the first-mentioned slurry, and positioning said finer particles onto said coarser particles about the periphery of each of said logs adjacent said one end thereof, said coarse and fine particles forming a sealing cake about said lengths of wood of a thickness sufficient to prevent any appreciable amount of liquid from passing therethrough and out of said chamber.

8. The process as defined in claim 5 wherein said ends of each of said lengths of wood in communication with the exterior of the chamber are within a plane substantially perpendicular to the longitudinal axes of said lengths of wood.

9. The process as defined in claim 5 wherein said pressure at said other end of the lengths of wood at which the treating fluid enters is from about 50 p.s.i. to about 1000 p.s.i.

10. The process as defined in claim 5 wherein said slurry contains from about 40 to about 60 percent solids by weight.

11. The process as defined in claim 5 wherein the fluid medium of said slurry consists essentially of said liquid treating medium.

12. The process as defined in claim 5 wherein said liquid treating medium is a preservative for said wood.

13. The process as defined in claim 5 wherein said liquid treating medium is a composition for dimensionally stabilizing said wood to prevent shrinkage and swelling.

14. The process as defined in claim 5 wherein said liquid treating medium is a composition for inhibiting attack by corrosive liquids.

15. The process as defined in claim 5 wherein said liquid treating medium is a fire-retardant composition.

16. The process as defined in claim 5 wherein said treating medium is a solvent seasoning agent.

17. The method of drying a length of wood including a log, pole, and the like comprising positioning said length of wood in a treating zone, introducing a slurry containing solid granules less than about 105 microns in diameter into said zone and positioning said granules about one end of said length of wood while leaving said end of said wood in communication with the exterior of said zone, said granules forming a sealing cake about said length of wood of a thickness sufficient to prevent any appreciable amount of fluid from passing therethrough and out of said zone, placing a fluid treating medium in said zone to immerse said length of wood therein and bringing the temperature of said medium in said zone to a point sufficient to vaporize the water in said wood, said medium being maintained under a pressure sufficient to prevent water vapor from the wood from passing into said medium said vapor passing through the end of said wood in communication with the exterior of said zone, and then moving said wood from said treating zone.

18. An apparatus for the pressure impregnation of the interior of a length of wood including a log, pole, and the like, with a fluid treating medium comprising a pressure vessel having a perforated member disposed cross-sectionally thereof, a member having fine pores adjacent said perforated member, said vessel and said members defining a treating zone for a length of wood held therein with one end thereof in contact with said porous member, means for introducing a slurry containing solid granules of a size larger than the pores of said porous member into said zone and positioning said granules on said porous member about the periphery of said length of wood adjacent its end to form a sealing cake sufficient to prevent passage of any appreciable amount of fluid therethrough and means for introducing a fluid treating medium into said treating zone under pressure sufficient to cause said treating medium to enter the other end of said length of wood and force the natural fluids therein to pass out of said end of said wood in contact with said porous member.

19. The apparatus as defined in claim 18 wherein said porous member is a fabric.

20. An apparatus for the impregnation of the interior of a log, pole, and the like, with a liquid treating medium comprising a pressure vessel having a perforated member disposed cross-sectionally thereof, said vessel and said perforated member defining a treating zone for a log positioned therein, a porous member adjacent said perforated member within said vessel, a slurry tank, means for introducing a slurry from said slurry tank into said treating zone about one end of a log positioned in said zone, a liquid treating medium tank, and means for introducing a liquid treating medium from said tank into said treating zone and maintaining said medium under pressure therein about said log.

21. The apparatus as defined in claim 20 further comprising a perforated member disposed cross-sectionally of said pressure vessel adjacent each end thereof, a porous member adjacent each of said perforated members, and means for introducing slurry into said treatment zone about one end of a log positioned adjacent each of said porous members.

22. The apparatus as defined in claim 20 wherein said perforated member is disposed cross-sectionally within a pressure resistant closure for said pressure vessel.

23. An apparatus for the impregnation of the interior of a log, pole, and the like, with a liquid treating medium comprising a liquid treating medium tank, a pressure vessel disposed within and partially submerged in said tank, a perforated member disposed cross-sectionally of said vessel, a porous member in adjoining contact with said perforated member and disposed within said vessel to define a treating zone for a log positioned within said vessel, means for positioning one end of said log against said porous member and maintaining said log in this position, means for sealing said pressure vessel with said log therein, a slurry tank, means for introducing said slurry into said treating zone and means for introducing additional liquid treating medium under pressure into said pressure vessel to cause the particles of said slurry to cake on said porous member and effect a seal thereon against passage of liquid treating medium through said porous member.

24. An apparatus for forming a seal about one end of a log to be subjected to pressure impregnation with a liquid treating medium comprising an annular cylinder disposed about one end of said log and provided with an inwardly disposed flange adjacent one end thereof to space the inner walls of said cylinder from the periphery of said log, sealing means within said cylinder adjacent said flange, mounting means secured to the other end of said cylinder, a perforated member secured to said mounting means and capping the end of said cylinder, a porous member within said cylinder adjacent said perforated member and extending throughout the cross-sectional area of said cylinder, said cylinder having an opening therein, and means for introducing a slurry into said cylinder to form a slurry cake about said log to effectively seal the space within said cylinder against liquid flow.

25. The apparatus as defined in claim 24, including a retaining ring clamped about said log at a point spaced from the end of said cylinder and means for securing said ring to said end of said cylinder.

26. A process for the impregnation of at least a substantial portion of the interior of at least one length of wood including logs, poles, and the like, with a liquid treating medium comprising positioning said at least one length of wood in a treating zone, introducing liquid treating medium into said zone to immerse said at least one length of wood, introducing a slurry containing solid granules substantially all of which are less than about 105 microns in diameter into said zone and positioning said granules about one end of said at least one length of wood while leaving the said end in communication with the exterior of said zone, said granules forming a sealing cake about said at least one length of wood of a thickness sufficient to prevent any appreciable amount of liquid from passing therethrough and out of said zone, placing further liquid treating medium in said zone and effecting a difference in pressure between opposite sides of the sealed area adjacent the end of said at least one length of wood, said pressure being sufficient to force said liquid treating medium into said other end of said at least one length of wood while simultaneously forcing out the natural fluids present in said wood.

27. The process as defined in claim 26 wherein said at least one length of wood is positioned in a horizontal treating zone.

References Cited

UNITED STATES PATENTS

| 609,442 | 8/1898 | Lebioda | 21—65 |
| 694,956 | 3/1902 | Ferrell | 21—71 XR |
| 1,132,025 | 3/1915 | Neble | 21—71 |

FOREIGN PATENTS

| 30,055 | 1896 | Great Britain. |

OTHER REFERENCES

Wallis-Tayler, A. J.: The Preservation of Wood; William Rider & Son; London, 1917 (pp. 121 and 122 relied on).

MORRIS O. WOLK, *Primary Examiner.*

BARRY S. RICHMAN, *Assistant Examiner.*

U.S. Cl. X.R.

21—7, 65, 68, 71, 72; 34—9.5, 13.8; 117—147